US011403035B2

(12) United States Patent
Walker

(10) Patent No.: US 11,403,035 B2
(45) Date of Patent: *Aug. 2, 2022

(54) MEMORY MODULE INCLUDING A CONTROLLER AND INTERFACES FOR COMMUNICATING WITH A HOST AND ANOTHER MEMORY MODULE

(71) Applicant: Micron Technology, Inc., Boise, ID (US)

(72) Inventor: Robert M. Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/226,057

(22) Filed: Dec. 19, 2018

(65) Prior Publication Data

US 2020/0201565 A1    Jun. 25, 2020

(51) Int. Cl.
*G06F 3/06* (2006.01)
(52) U.S. Cl.
CPC ............ *G06F 3/0659* (2013.01); *G06F 3/061* (2013.01); *G06F 3/062* (2013.01); *G06F 3/0604* (2013.01); *G06F 3/0652* (2013.01); *G06F 3/0683* (2013.01)
(58) Field of Classification Search
CPC ...... G06F 3/0659; G06F 3/0604; G06F 3/061; G06F 3/062; G06F 3/0652; G06F 3/0683
See application file for complete search history.

(56) References Cited

U.S. PATENT DOCUMENTS 7,574,555 B2    8/2009  Porat et al.
7,730,254 B2    6/2010  Risse
(Continued)

FOREIGN PATENT DOCUMENTS

KR    10-2015-0120359    10/2015

OTHER PUBLICATIONS

International Search Report and Written Opinion for related PCT Application No. PCT/US2019/064474, dated Mar. 23, 2020, 13 pages.

*Primary Examiner* — Tuan V Thai
(74) *Attorney, Agent, or Firm* — Brooks, Cameron & Huebsch, PLLC

(57) ABSTRACT

Apparatuses and methods related to a memory module controller are disclosed. An example apparatus, such as a dual in-line memory module (DIMM), includes a first interface coupled to a host, and a second interface coupled to another memory module. The memory module includes a controller configured to simultaneously communicate with the host via the first interface, which may be a non-volatile DIMM (NVDIMM) interface in one example, and communicate with the other memory module via the second interface. In some examples, the first and second interfaces are configured according to different standards or protocols. The controller controls access to memory on the memory module. The controller may be configured to receive commands from a direct memory access (DMA) module. In some examples, the other memory module connected via the second interface includes a local controller and memory of a different type. In some examples, the memory modules may be heterogeneous, and may include non-volatile or volatile memories, or both. In one embodiment, the controller includes a cache controller and a dynamic random access memory (DRAM) controller.

24 Claims, 8 Drawing Sheets

(56) References Cited

U.S. PATENT DOCUMENTS

| | | | |
|---|---|---|---|
| 7,778,092 B2* | 8/2010 | Klein | G06F 13/1673 365/189.05 |
| 9,990,246 B2 | 6/2018 | Nale et al. | |
| 2005/0050255 A1* | 3/2005 | Jeddeloh | G11C 5/00 710/317 |
| 2008/0082766 A1* | 4/2008 | Okin | G06F 12/0893 711/154 |
| 2009/0006774 A1* | 1/2009 | Bartley | G06F 13/1684 711/154 |
| 2010/0115191 A1* | 5/2010 | Hampel | G06F 12/08 711/103 |
| 2012/0102292 A1 | 4/2012 | Rajan et al. | |
| 2012/0260024 A1* | 10/2012 | Haywood | G06F 13/1694 711/103 |
| 2014/0298454 A1* | 10/2014 | Heng | G06F 21/55 726/22 |
| 2015/0261446 A1 | 9/2015 | Lee et al. | |
| 2015/0261698 A1* | 9/2015 | Zhang | G06F 13/1621 711/156 |
| 2016/0034195 A1* | 2/2016 | Li | G06F 3/0635 711/117 |
| 2016/0239233 A1* | 8/2016 | Haywood | G06F 13/1673 |
| 2016/0378344 A1 | 12/2016 | Nachimuthu et al. | |
| 2017/0161223 A1* | 6/2017 | Song | G06F 13/1673 |
| 2017/0255383 A1 | 9/2017 | Chang et al. | |
| 2017/0278562 A1 | 9/2017 | Nale | |
| 2017/0285941 A1* | 10/2017 | Nale | G06F 13/16 |
| 2017/0286354 A1 | 10/2017 | Feehrer et al. | |
| 2017/0322726 A1* | 11/2017 | Walker | G06F 13/1626 |
| 2018/0059945 A1 | 3/2018 | Helmick et al. | |
| 2018/0089079 A1* | 3/2018 | Hansson | G06F 12/0623 |
| 2018/0113628 A1* | 4/2018 | Roberts | G06F 13/14 |
| 2019/0236030 A1* | 8/2019 | Lim | G06F 3/0622 |

* cited by examiner

MEMORY MODULE INCLUDING A CONTROLLER AND INTERFACES FOR COMMUNICATING WITH A HOST AND ANOTHER MEMORY MODULE

TECHNICAL FIELD

The present disclosure relates generally to memory devices, and more particularly, to apparatuses and methods for a memory module controller.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

Memory can be part of a memory module (e.g., a dual in-line memory module (DIMM)) used in computing devices. Memory modules can include volatile memory, such as DRAM, for example, and/or non-volatile memory, such as Flash memory or RRAM, for example. The DIMMs can be used as a main memory in computing systems.

DETAILED DESCRIPTION

Figure 1:
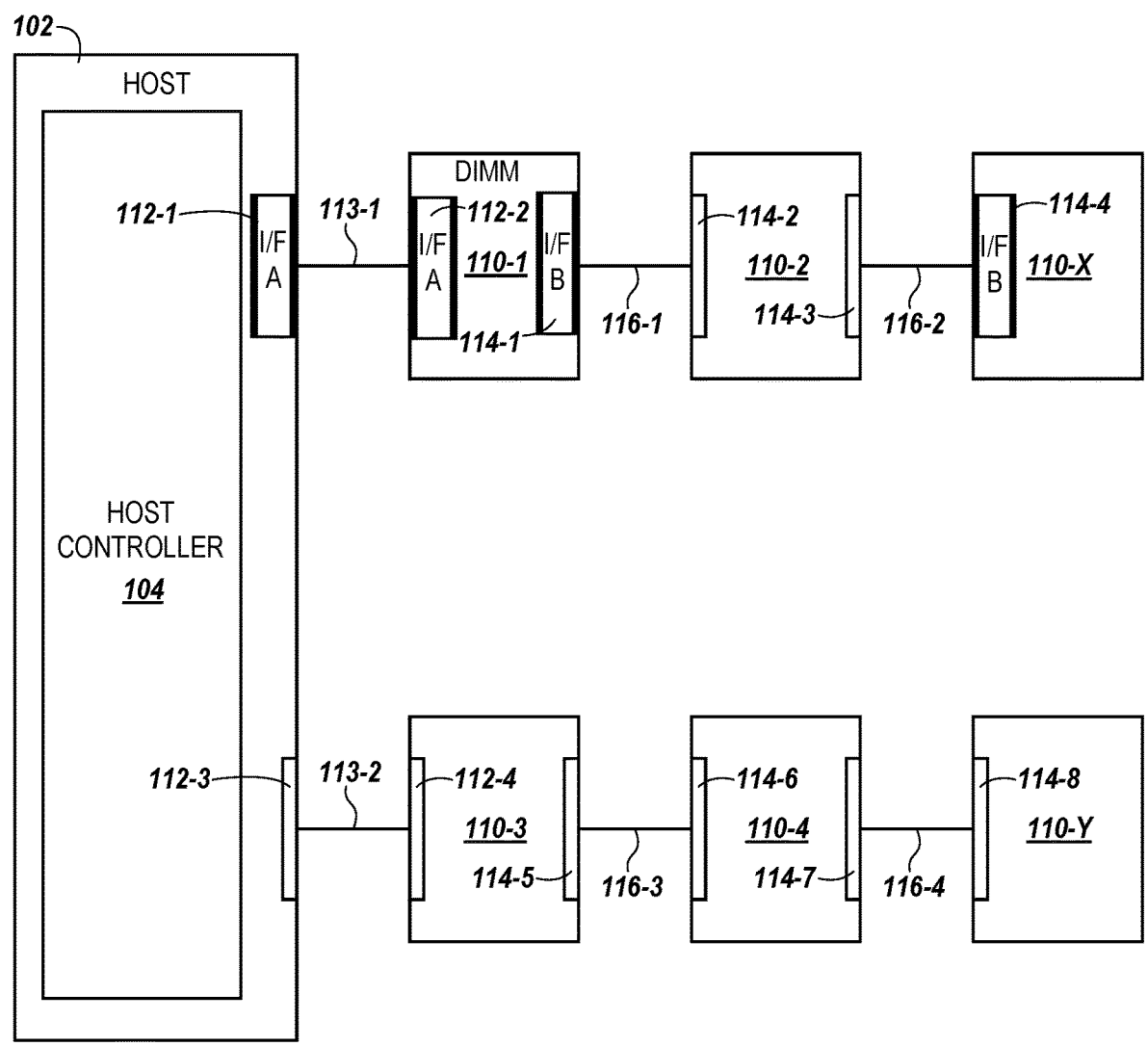
FIG. 1 is a block diagram of an apparatus in the form of a computing system including a memory system in accordance with a number of embodiments of the present disclosure.

The present disclosure includes apparatuses and methods related to a memory module controller. An example apparatus can include a first interface coupled to a host, a second interface couplable to a memory module, and a controller, wherein the controller is configured to communicate with the host via the first interface and communicate with the memory module via the second interface.

In a number of embodiments, a first DIMM is coupled to a host via a first interface. The first interface can be formed on a printed circuit board. The first DIMM can be coupled to a number of other DIMMs via a second interface. The host communicates with the number of other DIMMs through the first DIMM via the first interface. The first DIMM includes a controller to execute commands from the host and/or to send commands and/or data to the number of other DIMMs coupled to the first DIMM on the second interface.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designator "N" indicates that a number of the particular feature(s) so designated can be included with a number of embodiments of the present disclosure.

As used herein, "a number of" something refers to one or more such things. For example, a number of memory devices refers to one or more of memory devices. Additionally, designators such as "N", as used herein, particularly with respect to reference numerals in the drawings, indicate that a number of the particular feature(s) so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 is a block diagram of an apparatus in the form of a computing system including a memory system in accordance with a number of embodiments of the present disclosure. As used herein, an "apparatus" refers to, but is not limited to, any of a variety of structures or combinations of structures, such as a circuit or circuitry, a die or dice, a module or modules, a device or devices, or a system or systems, for example. In the embodiment illustrated in FIG.

1, a memory system includes one or more memory modules, such as memory modules 110-1, ..., 110-X, and 110-3, ..., 110-Y, for example. Memory modules 110-1, ..., 110-X, and 110-3, ..., 110-Y can be dual in-line memory modules (DIMM) and can include volatile memory, such as DRAM, and/or non-volatile memory, such as storage class memory and/or three-dimensional cross point (3D X-point) memory, among other types of memory. Memory systems can include any type of memory device, such as DIMMs with memory. In a number of embodiments, a memory system includes a multi-chip device. A multi-chip device can include a number of different memory types and/or memory modules. A memory system can include non-volatile or volatile memory on any type of a module. The examples described below in association with FIGS. 1-5 use a DIMM as the memory module, but the examples of the present disclosure can be used on any memory system.

In FIG. 1, a memory system includes host 102 coupled to dual in-line memory module (DIMM) 110-1 via a channel including bus 113-1, interface A 112-1, and interface A 112-2. DIMM 110-1 is coupled to DIMMs 110-2 and 110-X and DIMM 110-1 can be coupled to additional DIMMs or other memory modules and/or devices that are not shown in FIG. 1. DIMMs 110-1, 110-2, and 110-X are coupled together and are configured to transfer commands and/or data between each other. In FIG. 1, DIMM 110-1 is coupled to DIMM 110-2 via bus 116-1, interface B 114-1, and interface B 114-2. DIMM 110-2 is coupled to DIMM 110-X via bus 116-2, interface B 114-3 and interface B 114-4. Interfaces A 112-1, 112-2, 112-3, and 112-4 can be used to couple host 102 to a DIMM (e.g., DIMMs 110-1 and 110-3 in FIG. 1). Interfaces B 114-1, ..., 114-8 can be used to couple DIMMs 110-1, ..., 110-X, and 110-3, ..., 110-Y to each other. Interface A can be the same type of interface as interface B; and interface A can be a different type of interface as Interface B. Interface A can be a non-volatile dual in-line memory module (NVDIMM) interface that allows for non-deterministic execution of the commands. Interface B can be a parallel, a serial, and/or a multiple serial interface. The type of interface for interface A and/or interface B is dependent on the type of memory module and/or the type of memory devices on the memory module. For example, DIMM 110-1 can include interface A 112-2 that is an NVDIMM interface to communicate with host 102, where host 102 includes interface A 112-1 that is also in an NVDIMM interface. DIMM 110-1 can include interface B 114-1 that is a double data rate (DDR) 5 interface to communicate with DIMM 110-2, where DIMM 110-2 is a DDR DIMM and includes interface B 114-2 that is a DDR5 interface. DIMM 110-2 can include interface B 114-3 that is a storage class memory interface to communicate with DIMM 110-X, where DIMM 110-X is a DIMM that includes storage class memory and interface B 114-4 is a storage class memory interface.

DIMMs 110-1 and 110-2 are configured to received commands from host 102 via interface A 112-2 and interface A 112-4, respectively. DIMMs 110-1 and 110-2 are configured to execute the commands by transferring data between DIMMs 110-1, ..., 110-X, and 110-3, ..., 110-Y via interfaces B 114-1, ..., 114-8 and between host 102 and DIMMs 110-1 and 110-2 via interface A 112-2 and interface A 112-4, respectively. The DIMMs are configured to transfer data between DIMMs 110-1, ..., 110-X, and 110-3, ..., 110-Y via interfaces B 114-1, ..., 114-8 while transferring data between host 102 and DIMMs 110-1 and 110-2 via interface A 112-2 and interface A 112-4, respectively.

In FIG. 1, a memory system includes host 102 coupled to DIMM 110-3 via a channel including bus 113-2, interface A 112-3, and interface A 112-4. DIMM 110-3 is coupled to DIMM 110-4 and 110-Y and DIMM 110-3 can be coupled to additional DIMMs or other memory modules and/or devices that are not shown in FIG. 1. DIMMs 110-3, 110-4, and 110-Y are coupled together and are configured to transfer commands and/or data between each other. In FIG. 1, DIMM 110-3 is coupled to DIMM 110-4 via bus 116-3, interface B 114-5, and interface B 114-6. DIMM 110-4 is coupled to DIMM 110-Y via bus 116-4, interface B 114-7 and interface B 114-8.

In a number of embodiments each of DIMMs 1110-1, ..., 110-X, and 110-3, ..., 110-Y includes a controller, such as a memory system controller. In a number of embodiments, at least one of the DIMMs 110-1, ..., 110-X that are coupled together includes a controller, such as a memory system controller; and at least one of the DIMMs 110-3, ..., 110-Y that are coupled together includes a controller, such as a memory system controller. A memory system controller will be described below in association with FIGS. 3A-5. A controller on DIMMs 110-1, ..., 110-X, and 110-3, ..., 110-Y receives commands from host 102 and control execution of the commands on a DIMM. Also, embodiments of the present disclosure could be implemented by a memory device on a DIMM without a controller, wherein execution of the commands according to the present disclosure is built into the memory device.

The host 102 sends commands to the DIMMs 110-1, ..., 110-X, and 110-3, ..., 110-Y using a protocol that is dependent on the type of memory in the DIMMs. In an example, the host uses an NVDIMM protocol to communicate on the same channel with an NVDIMM DIMM and a DDR5 protocol to communicate with a DRAM DIMM that are coupled together.

As illustrated in FIG. 1, a host 102 is coupled to DIMMs 110-1, ..., 110-X and 110-3, ..., 110-Y. In a number of embodiments, DIMMs 110-1, ..., 110-X, are coupled to host 102 via a channel that includes interface A 112-1 and 112-2, bus 113-1, interface B 114-1, ..., 114-4, and bus 116-1 and 116-2. As shown in FIG. 1, DIMMs 110-3, ..., 110-Y, are coupled to host 102 via a channel that includes interface A 112-3 and 112-4, bus 113-2, interface B 114-5, ..., 114-8, and bus 116-3 and 116-4. Host 102 can be a laptop computer, personal computer, digital camera, digital recording and playback device, mobile telephone, PDA, memory card reader, interface hub, among other host systems, and can include a memory access device, e.g., a processor. One of ordinary skill in the art will appreciate that "a processor" may include one or more processors, such as a parallel processing system, a number of coprocessors, a processing resource, etc.

Host 102 includes a host controller 104 to communicate with a memory system. The host controller 104 sends commands to the DIMMs 110-1, ..., 110-X, and 110-3, ..., 110-Y. The host controller 104 can communicate with the DIMMs 110-1, ..., 110-X, and 110-3, ..., 110-Y and/or a controller on each of the DIMMs 110-1, ..., 110-X, and 110-3, ..., 110-Y to read, write, and erase data, among other operations. An interface (e.g., interface A 112) can pass control, address, data, and other signals between a DIMM (e.g., DIMMs 110-1, ..., 110-X, and 110-3, ..., 110-Y) and host 102 having compatible receptors for the interface. The signals can be communicated between host 102 and DIMMs 110-1, ..., 110-X, and 110-3, ..., 110-Y on a number of buses (e.g., bus 113-1 and 113-2), such as a data bus and/or an address bus, for example, via a number of channels. An interface (e.g., interface B 114) can pass control, address, data, and other signals between DIMMs (e.g., DIMMs 110-1, . . . , 110-X, and 110-3, . . . , 110-Y) having compatible receptors for the interface. The signals can be communicated between DIMMs 110-1, . . . , 110-X, and 110-3, . . . , 110-Y on a number of buses (e.g., bus 116-1, . . . , 116-4), such as a data bus and/or an address bus, for example, via a number of channels.

The host controller 104 and/or a controller on a DIMM can include control circuitry, e.g., hardware and/or firmware, and/or software. In one or more embodiments, the host controller 108 and/or a controller on a DIMM is an application specific integrated circuit (ASIC) formed on a printed circuit board including a physical interface. Also, each DIMM 110-1, . . . , 110-X, and 110-3, . . . 110-Y can include buffers of volatile and/or non-volatile memory and registers. Buffers may be used to buffer data that is used during execution of read commands and/or write commands.

The DIMMs 110-1, . . . , 110-X, and 110-3, . . . , 110-Y can provide main memory for the memory system or could be used as additional memory or storage throughout the memory system. Each DIMM 110-1, . . . , 110-X, and 110-3, . . . , 110-Y can include a number of memory devices, each having one or more arrays of memory cells, (e.g., volatile and/or non-volatile memory cells). The arrays can be flash arrays with a NAND architecture, for example. Embodiments are not limited to a particular type of memory device. For instance, the memory device can include RAM, ROM, DRAM, SDRAM, PCRAM, RRAM, 3D X-Point, and flash memory, among others.

The embodiment of FIG. 1 can include additional circuitry that is not illustrated so as not to obscure embodiments of the present disclosure. For example, the memory system can include address circuitry to latch address signals provided over I/O connections through I/O circuitry. Address signals can be received and decoded by a row decoder and a column decoder to access the DIMMs 110-1, . . . , 110-X, and 110-3, . . . , 110-Y. It will be appreciated by those of ordinary skill in the art that the number of address input connections depends on the density and architecture of the DIMMs 110-1, . . . , 110-X, and 110-3, . . . , 110-Y.

Figure 2A:
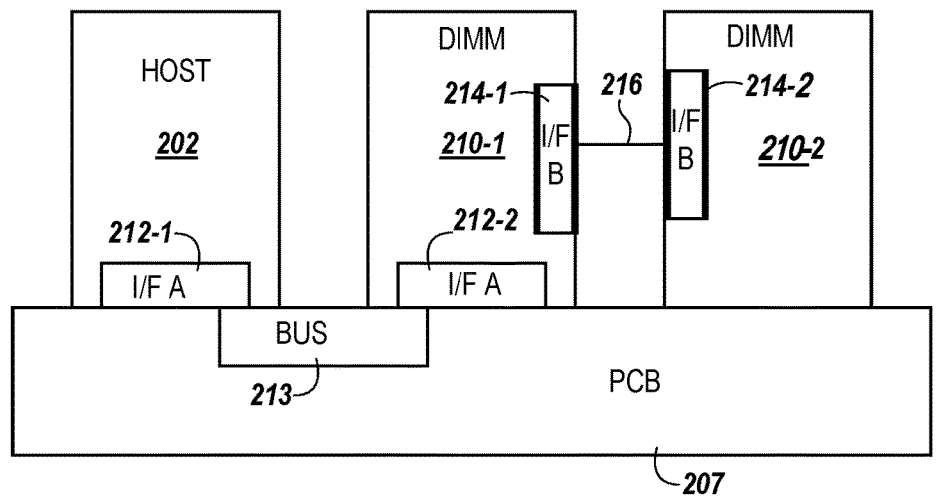
FIGS. 2A and 2B are block diagrams of an apparatus in the form of a computing system including at least a portion of a memory system on a printed circuit board (PCB) in accordance with a number of embodiments of the present disclosure.
Figure 2B:
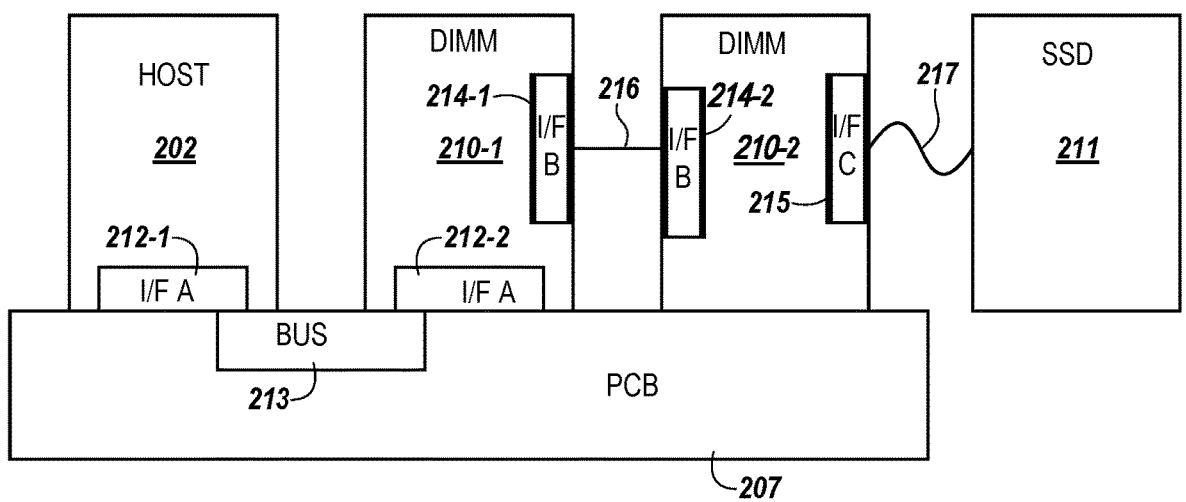

FIGS. 2A and 2B are block diagrams of an apparatus in the form of a computing system including at least a portion of a memory system on a printed circuit board (PCB) in accordance with a number of embodiments of the present disclosure. In FIG. 2A, host 202, DIMM 210-1, and DIMM 210-2 are formed on PCB 207. Host 202 is coupled to DIMM 210-1 via interface A 212-1, interface A 212-2, and bus 213. Bus 213 is formed in PCB 207. Host 202 can send commands and/or data to DIMM 210-1 and DIMM 210-2 on bus 213. DIMM 210-1 is coupled to DIMM 210-2 via interface B 214-1, interface B 214-2, and bus 216. Commands and/or data from host 202, DIMM 210-1, and/or DIMM 210-2 can be transferred between DIMM 210-1 and 210-2 via interface B 214-1, interface B 214-2, and bus 216.

DIMM 210-1 and 210-2 receive power and ground signals via connection points on the PCB 207. DIMM 210-2 receives commands and/or data on bus 216, which is off PCB 207. A number of DIMMs can be coupled together via buses (e.g., bus 216) and interfaces (e.g., interface B 214) that are not on (i.e., off) the PCB 207. This allows a number of DIMMs to be coupled together and not be constrained by the physical limitations of using connections points on PCB 207. In a number of embodiments, bus 216 that couples DIMM 210-1 to DIMM 210-2 can be located on PCB 207.

Commands and/or data can be transferred between host 202 and DIMM 210-1 on bus 213 while commands and/or data are transferred between DIMM 210-1 and DIMM 210-2 on bus 216. Bus 213 and bus 216 can be controlled independently of each other. Also, DIMM 210-1 can be configured to transfer commands and/or data from host 202 that are intended for DIMM 210-2 to DIMM 210-2, and DIMM 210-1 can be configured to transfer commands and/or data from DIMM 210-2 that are intended for host 202 to host 202.

In FIG. 2B, host 202, DIMM 210-1, and DIMM 210-2 are formed on PCB 207 and solid state drive (SSD) 211 is coupled to DIMM 210-2. SSD 211 is not formed on PCB 207. Host 202 is coupled to DIMM 210-1 via interface A 212-1, interface A 212-2, and bus 213. Bus 213 is formed in PCB 207. Host 202 can send commands and/or data to DIMM 210-1 and DIMM 210-2 on bus 213. DIMM 210-1 is coupled to DIMM 210-2 via interface B 214-1, interface B 214-2, and bus 216. SSD 211 is coupled to DIMM 210-2 via interface C 215 and bus 217. Commands and/or data from host 202, DIMM 210-1, DIMM 210-2, and/or SSD 211 can be transferred between DIMM 210-1 and 210-2 via interface B 214-1, interface B 214-2, and bus 216 and/or between DIMM 210-1 and SSD 211 via interface C 215 and bus 217.

DIMM 210-1 and 210-2 can receive power and ground signals via connection points on the PCB 207. DIMM 210-2 can receive commands and/or data on bus 216, which is off PCB 207. A number of DIMMs can be coupled together via buses (e.g., bus 216) and interfaces (e.g., interface B 214) that are not on the PCB 207. DIMMS can be coupled to other memory devices (e.g., SSD 211) that are also not on PCB 207. This allows a number of DIMMs and memory devices to be coupled together and not be constrained by the physical limitations of using connections points on PCB 207. In a number of embodiments, bus 217 and SSD 211 can be located on PCB 207.

Figure 3A:
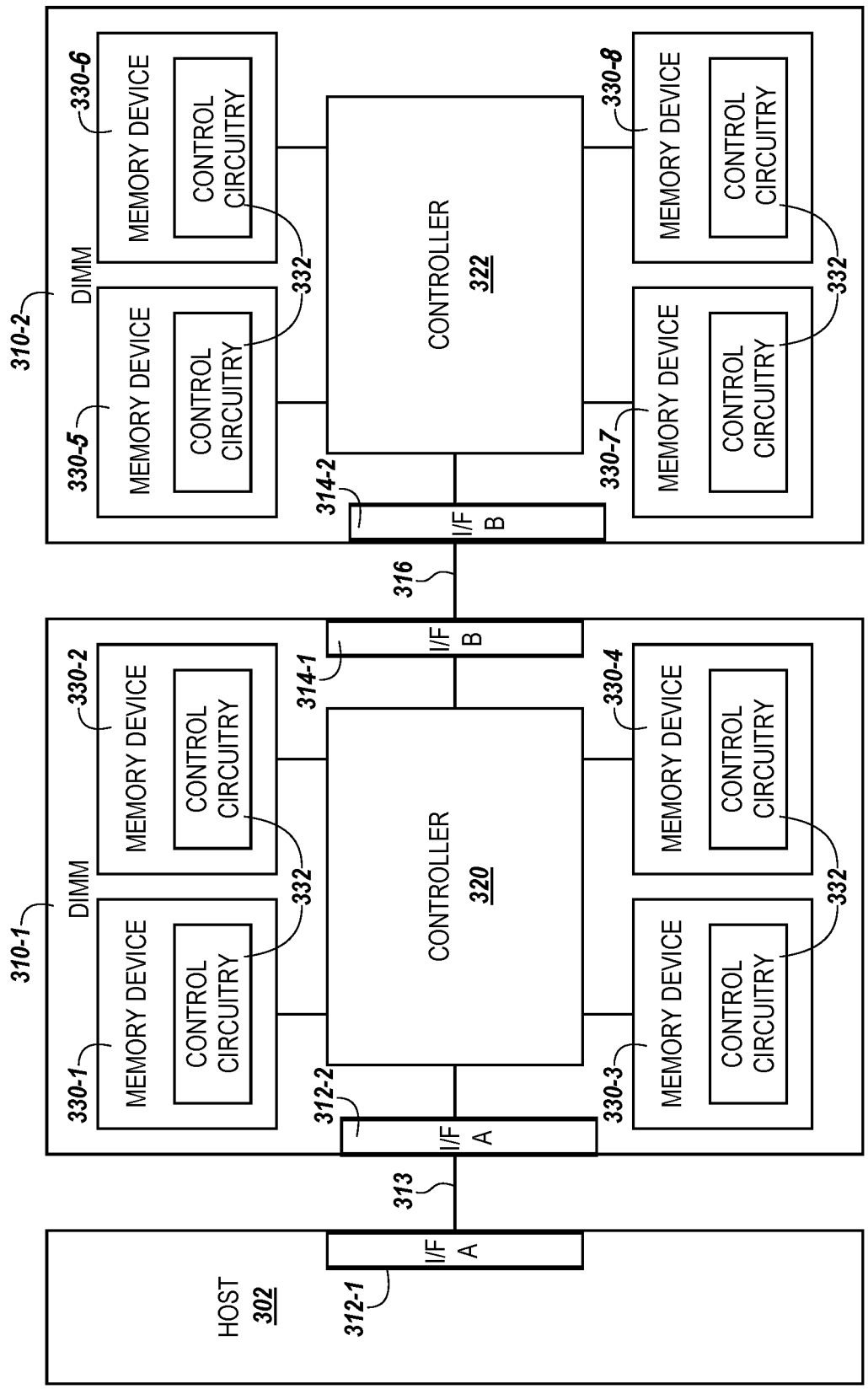
FIGS. 3A and 3B are block diagrams of an apparatus in the form of a computing system including a memory system having a memory module with a memory system controller in accordance with a number of embodiments of the present disclosure.
Figure 3B:
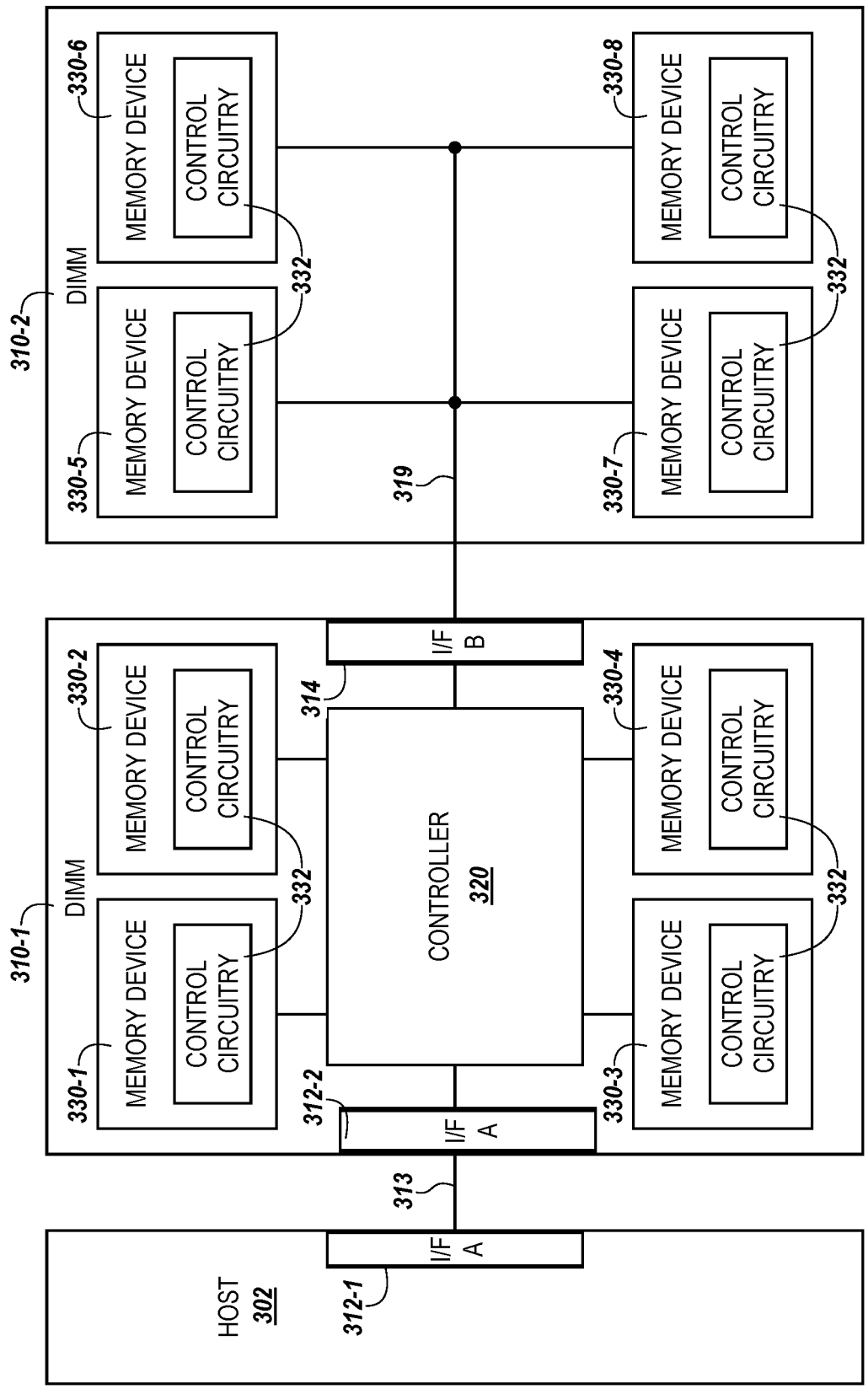

FIGS. 3A and 3B are block diagrams of an apparatus in the form of a computing system including a memory system having a memory module with a memory system controller in accordance with a number of embodiments of the present disclosure. In FIG. 3A, host 302 is coupled to DIMM 310-1 via interface A 312-1, interface A 312-2, and bus 313. DIMM 310-1 includes controller 320 coupled to interface A 312-2. DIMM 310-1 includes memory devices 330-1, . . . , 330-4 coupled to controller 320. Memory devices 330-1, . . . , 330-4 can include non-volatile memory arrays and/or volatile memory arrays. As shown in FIG. 3A, memory devices 330-1, . . . , 330-4 include control circuitry 332, e.g., hardware and/or firmware, and/or software used to execute commands on the memory devices 330-1, . . . , 330-4. Control circuitry 332 receives commands from controller 320. Control circuitry 332 is configured to execute commands to read and/or write data in the memory devices 330-1, . . . , 330-4. For example, DIMM 310-1 can be an NVDIMM with memory devices 330-1 and 330-2 that include DRAM and memory devices 330-3 and 330-4 that include 3D X-Point memory.

DIMM 310-1 is coupled to DIMM 310-2 via interface B 314-1, interface B 314-2, and bus 316. DIMM 310-2 includes controller 322 coupled to interface B 314-2. DIMM 310-2 includes memory devices 330-5, . . . , 330-8 coupled to controller 322. Memory devices 330-5, . . . , 330-8 can include non-volatile memory arrays and/or volatile memory arrays. As shown in FIG. 3A, memory devices 330-5, . . . , 330-8 include control circuitry 332 (e.g., hardware, firmware), and/or software used to execute commands on the memory devices 330-5, . . . , 330-8. Control circuitry 332 receives commands from controller 320. Control circuitry 332 is configured to execute commands to read and/or write data in the memory devices 330-5, . . . , 330-8. Memory devices 330-5, . . . , 330-8 may include storage class memory.

Controller 320 on DIMM 310-1 can be a memory system controller. A memory system controller receives commands and/or data and determines where to send the commands and/or data. Controller 320 can receive commands from host 302 and/or DIMM 310-2 and determine that the commands are to be executed by DIMM 310-1. Controller 320 controls execution of the commands in response to determining the commands are to be executed by DIMM 310-1. Controller 320 can receive commands from host 302 and determine that the commands are to be executed by DIMM 310-2. Controller 320 can transfer the commands to DIMM 310-2 in response to determining the commands are to be executed by DIMM 310-2. Controller 320 can receive data from host 302 and determine that the data is to be stored on DIMM 310-2. Controller 320 can cause the data to be written DIMM 310-2 in response to determining the data is to be stored on DIMM 310-2. Controller 320 can receive data from DIMM 310-2 and determine that the data is to be sent to host 302. Controller 320 can send the data to host 302 in response to determining the data is to be sent to host 302.

In FIG. 3B, host 302 is coupled to DIMM 310-1 via interface A 312-1, interface A 312-2, and bus 313. DIMM 310-1 includes controller 320 coupled to interface A 312-2. DIMM 310-1 includes memory devices 330-1, . . . , 330-4 coupled to controller 320. Memory devices 330-1, . . . , 330-4 can include non-volatile memory arrays and/or volatile memory arrays. As shown in FIG. 3B, memory devices 330-1, . . . , 330-4 include control circuitry 332, e.g., hardware and/or firmware, and/or software used to execute commands on the memory devices 330-1, . . . , 330-4. Control circuitry 332 receives commands from controller 320. Control circuitry 332 is configured to execute commands to read and/or write data in the memory devices 330-1, . . . , 330-4. For example, DIMM 310-1 can be an NVDIMM with memory devices 330-1 and 330-2 that include DRAM and memory devices 330-3 and 330-4 that include 3D X-Point memory.

DIMM 310-1 is coupled to DIMM 310-2 via bus 319. DIMM 310-2 includes memory devices 330-5, . . . , 330-8. Memory devices 330-5, . . . , 330-8 include non-volatile memory arrays and/or volatile memory arrays. As shown in FIG. 3B, memory devices 330-5, . . . , 330-8 include control circuitry 332, e.g., hardware and/or firmware, and/or software used to execute commands on the memory devices 330-5, . . . , 330-8. Control circuitry 332 receives commands from controller 320. Control circuitry 332 is configured to execute commands to read and/or write data in the memory devices 330-5, . . . , 330-8. Memory devices 330-5, . . . , 330-8 may include storage class memory.

Controller 320 on DIMM 310-1 can be a memory system controller. A memory system controller receives commands and/or data and determines where to send the commands and/or data. Controller 320 can receive commands from host 302 and/or DIMM 310-2 and determine that the commands are to be executed by DIMM 310-1 and/or DIMM 310-2. Controller 320 can control execution of the commands in response to determining where the commands are to be executed. Controller 320 can receive commands from host 302 and determine that the commands are to be executed using DIMM 310-2. Controller 320 can execute the commands to transfer data between DIMM 310-1 and DIMM 310-2 on bus 319 in response to determining the commands are to be executed using DIMM 310-2. Controller 320 can receive data from host 302 and determine that the data is to be stored on DIMM 310-2. Controller 320 can execute the command so the data is written on DIMM 310-2 via bus 319 in response to determining the data is to be stored on DIMM 310-2. Controller 320 can receive data from DIMM 310-2 via bus 319 and determine that the data is to be sent to host 302. Controller 320 can send the data to host 302 in response to determining the data is to be sent to host 302.

Figure 4A:
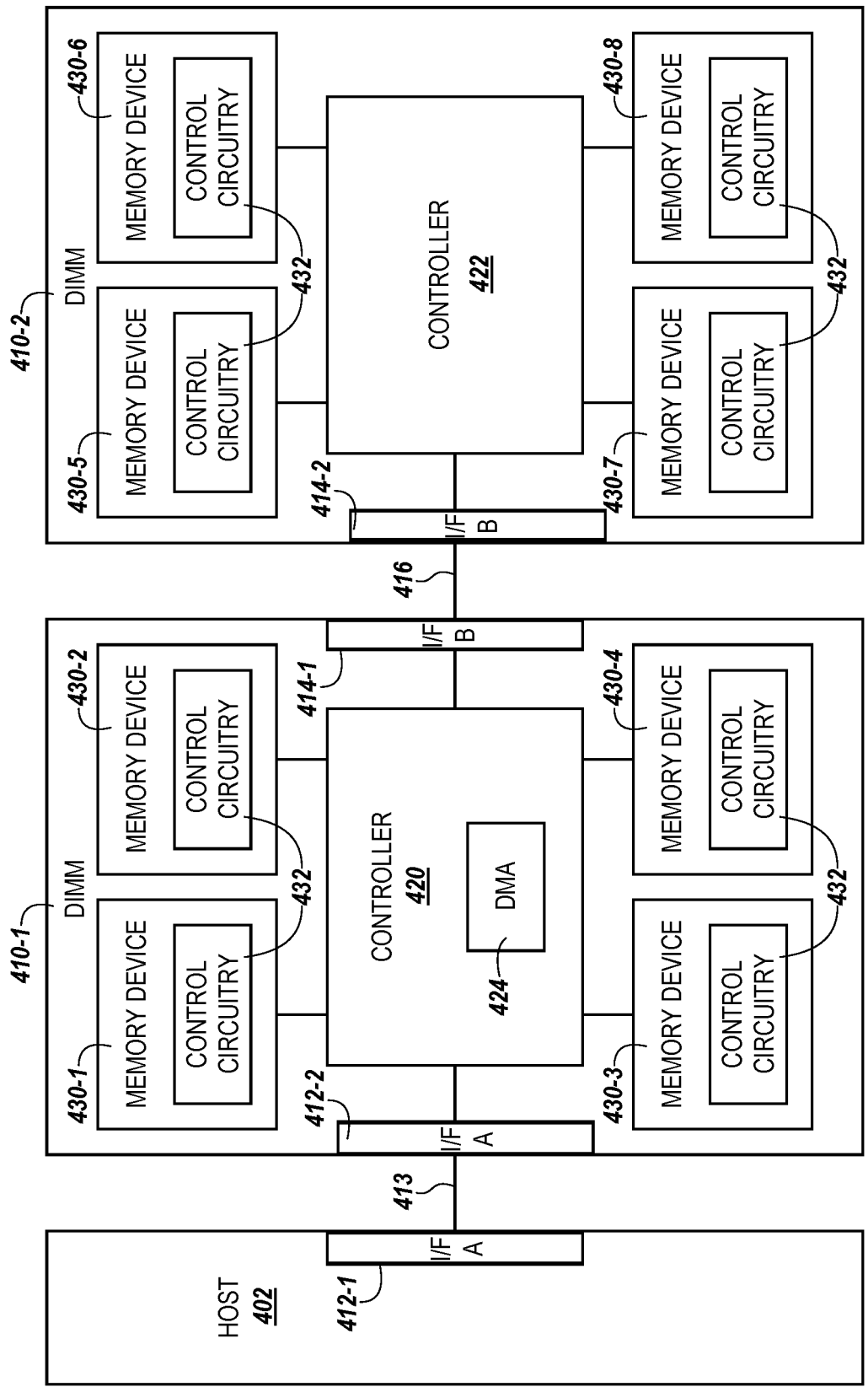
FIGS. 4A and 4B are block diagrams of an apparatus in the form of a computing system including a memory system having a memory module with a memory system controller and a direct memory access (DMA) module in accordance with a number of embodiments of the present disclosure.
Figure 4B:
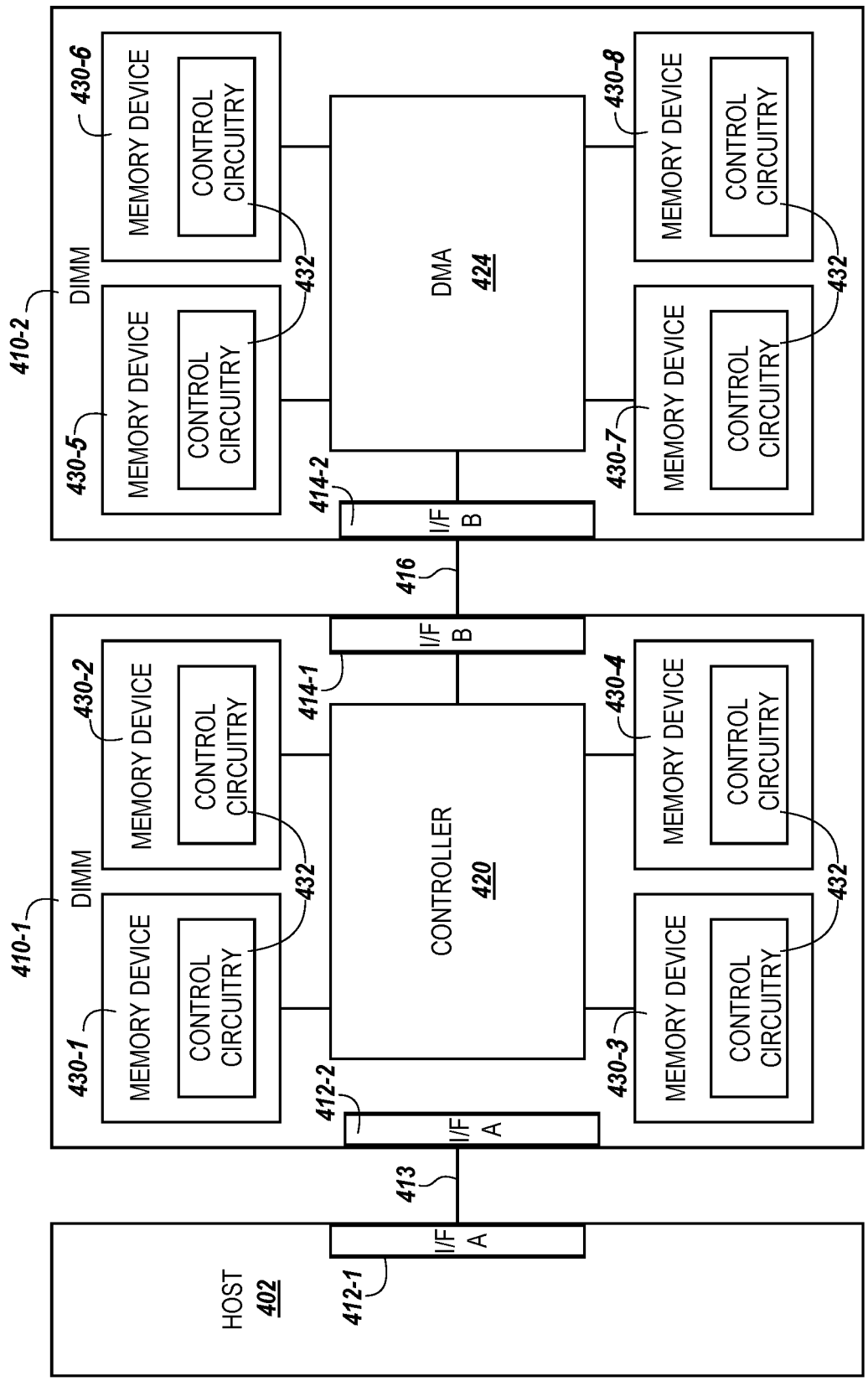

FIGS. 4A and 4B are block diagrams of an apparatus in the form of a computing system including a memory system having a memory module with a memory system controller and a direct memory access (DMA) module in accordance with a number of embodiments of the present disclosure. In FIG. 4A, host 402 is coupled to DIMM 410-1 via interface A 412-1, interface A 412-2, and bus 413. DIMM 410-1 includes controller 420 coupled to interface A 412-2. DIMM 410-1 includes memory devices 430-1, . . . , 430-4 coupled to controller 420. Memory devices 430-1, . . . , 430-4 include non-volatile memory arrays and/or volatile memory arrays. As shown in FIG. 4A, memory devices 430-1, . . . , 430-4 include control circuitry 432 (e.g., hardware, firmware, and/or software) used to execute commands on the memory devices 430-1, . . . , 430-4. Control circuitry 432 receives commands from controller 420. Control circuitry 432 is configured to execute commands to read and/or write data in the memory devices 430-1, . . . , 430-4. For example, DIMM 410-1 can be an NVDIMM with memory devices 430-1 and 430-2 that include DRAM, and memory devices 430-3 and 430-4 that include 3D X-Point memory.

DIMM 410-1 is coupled to DIMM 410-2 via interface B 414-1, interface B 414-2, and bus 416. DIMM 410-2 includes controller 422 coupled to interface B 414-2. DIMM 410-2 includes memory devices 430-5, . . . , 430-8 coupled to controller 422. Memory devices 430-5, . . . , 430-8 can include non-volatile memory arrays and/or volatile memory arrays. As shown in FIG. 4A, memory devices 430-5, . . . , 430-8 include control circuitry 432, e.g., hardware and/or firmware, and/or software to execute commands on the memory devices 430-5, . . . , 430-8. Control circuitry 432 receives commands from controller 420. Control circuitry 432 is configured to execute commands to read and/or write data in the memory devices 430-5, . . . , 430-8. Memory devices 430-5, . . . , 430-8 may include storage class memory.

Controller 420 on DIMM 410-1 can be a memory system controller. A memory system controller receives commands and/or data and determines where to send the commands and/or data. Controller 420 receives commands from host 402 and/or DIMM 410-2 and determines that the commands are to be executed by DIMM 410-1. As shown in FIG. 4A, controller 420 can include direct memory access (DMA) module 424. Controller 420 generates commands via DMA module 424 to perform DMA transfers of data from DIMM 410-2 to DIMM 410-1.

In FIG. 4B, host 402 is coupled to DIMM 410-1 via interface A 412-1, interface A 412-2, and bus 413. DIMM 410-1 includes controller 420 coupled to interface A 412-2. DIMM 410-1 includes memory devices 430-1, . . . , 430-4 coupled to controller 420. As shown in FIG. 4B, memory devices 430-1, . . . , 430-4 can include non-volatile memory arrays and/or volatile memory arrays. Memory devices 430-1, . . . , 430-4 include control circuitry 432, e.g., hardware and/or firmware, and/or software used to execute commands on the memory devices 430-1, . . . , 430-4. Control circuitry 432 receives commands from controller 420. Control circuitry 432 is configured to execute commands to read and/or write data in the memory devices 430-1, ..., 430-4. For example, DIMM 410-1 can be an NVDIMM with memory devices 430-1 and 430-2 that include DRAM, and memory devices 430-3 and 430-4 that include 3D X-Point memory.

DIMM 410-1 is coupled to DIMM 410-2 via bus 416. DIMM 410-2 includes memory devices 430-5, ..., 430-8. Memory devices 430-5, ..., 430-8 can include non-volatile memory arrays and/or volatile memory arrays. As shown in FIG. 4B, memory devices 430-5, ..., 430-8 include control circuitry 432, e.g., hardware and/or firmware, and/or software to execute commands on the memory devices 430-5, ..., 430-8. Control circuitry 432 receives commands from controller 420. Control circuitry 432 is configured to execute commands to read and/or write data in the memory devices 430-5, ..., 430-8. Memory devices 430-5, ..., 430-8 may include storage class memory.

Controller 420 on DIMM 410-1 can be a memory system controller. A memory system controller receives commands and/or data and determine where to send the commands and/or data. Controller 420 receives commands from host 402 and/or DIMM 410-2 and determine that the commands are to be executed by DIMM 410-1. As shown in FIG. 4B, DIMM 410-2 can include direct memory access (DMA) module 424. Controller 420 generates commands via DMA module 424 to perform DMA transfers of data from DIMM 410-2 to DIMM 410-1.

Figure 5:
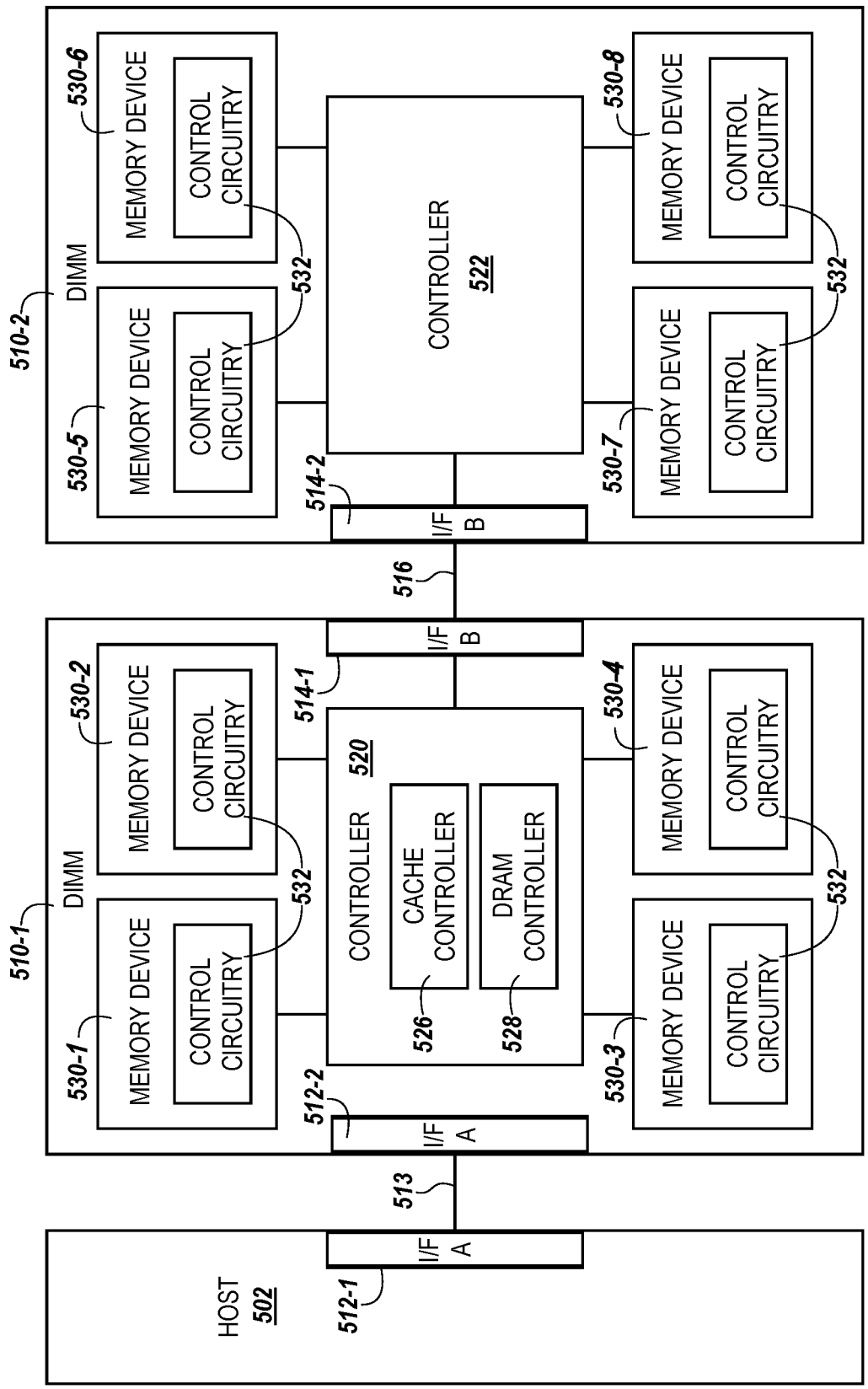
FIG. 5 is a block diagram of an apparatus in the form of a computing system including a memory system having a memory module with a memory system controller, a cache controller, and a DRAM controller in accordance with a number of embodiments of the present disclosure.

FIG. 5 is a block diagram of an apparatus in the form of a computing system including a memory system having a memory module with a memory system controller, a cache controller, and a DRAM controller in accordance with a number of embodiments of the present disclosure. In FIG. 5, host 502 is coupled to DIMM 510-1 via interface A 512-1, interface A 512-2, and bus 513. DIMM 510-1 includes controller 520 coupled to interface A 512-2. DIMM 510-1 includes memory devices 530-1, ..., 530-4 coupled to controller 520. Memory devices 530-1, ..., 530-4 can include non-volatile memory arrays and/or volatile memory arrays. As shown in FIG. 5, memory devices 530-1, ..., 530-4 include control circuitry 532, e.g., hardware and/or firmware, and/or software to execute commands on the memory devices 530-1, ..., 530-4. Control circuitry 532 receives commands from controller 520. Control circuitry 532 is configured to execute commands to read and/or write data in the memory devices 530-1, ..., 530-4. DIMM 510-1 can be a DDR5 DIMM with memory devices 530-1, ..., 530-4 that include DRAM.

DIMM 510-1 is coupled to DIMM 510-2 via interface B 514-1, interface B 514-2, and bus 516. DIMM 510-1 includes controller 522 coupled to interface B 514-2. DIMM 510-2 includes memory devices 530-5, ..., 530-8 coupled to controller 522. Memory devices 530-5, ..., 530-8 can include non-volatile memory arrays and/or volatile memory arrays. As shown in FIG. 5, memory devices 530-5, ..., 530-8 include control circuitry 532, e.g., hardware and/or firmware, and/or software to execute commands on the memory devices 530-5, ..., 530-8. Control circuitry 532 receives commands from controller 520. Control circuitry 532 is configured to execute commands to read and/or write data in the memory devices 530-5, ..., 530-8. Memory devices 530-5, ..., 530-8 may include storage class memory.

Controller 520 on DIMM 510-1 can be a memory system controller. A memory system controller receives commands and/or data and determines where to send the commands and/or data. Controller 520 can include a cache controller 526 and a DRAM controller 528. DIMM 510-1 can be configured as cache for the memory system. Cache tags and data can be stored in memory devices 530-1, ..., 530-4 and/or in memory, such as static random access memory (SRAM), on the memory devices 530-1, ..., 530-4 and/or controller 520. Controller 520 receives commands from host 502 and determines, using the cache controller 526, whether data associated with the commands are located in cache (e.g., in memory devices 530-1, ..., 530-4) based on the cache tag data. Controller 520 sends the data from devices 530-1, ..., 530-4 to host 502 using DRAM controller 528 in response to the cache controller 526 determining that the data associated with the commands is a hit (e.g., cache tag data in devices 530-1, ..., 530-4 matched tag data of the commands). Controller 520 sends the commands to DIMM 510-2 in response to determining that the data associated with the commands is a miss (e.g., cache tag data in devices 530-1, ..., 530-4 does not match tag data of the commands). DIMM 510-2 sends the data to host 502 via DIMM 510-1 in response to receiving the commands from controller 520.

Figure 6:
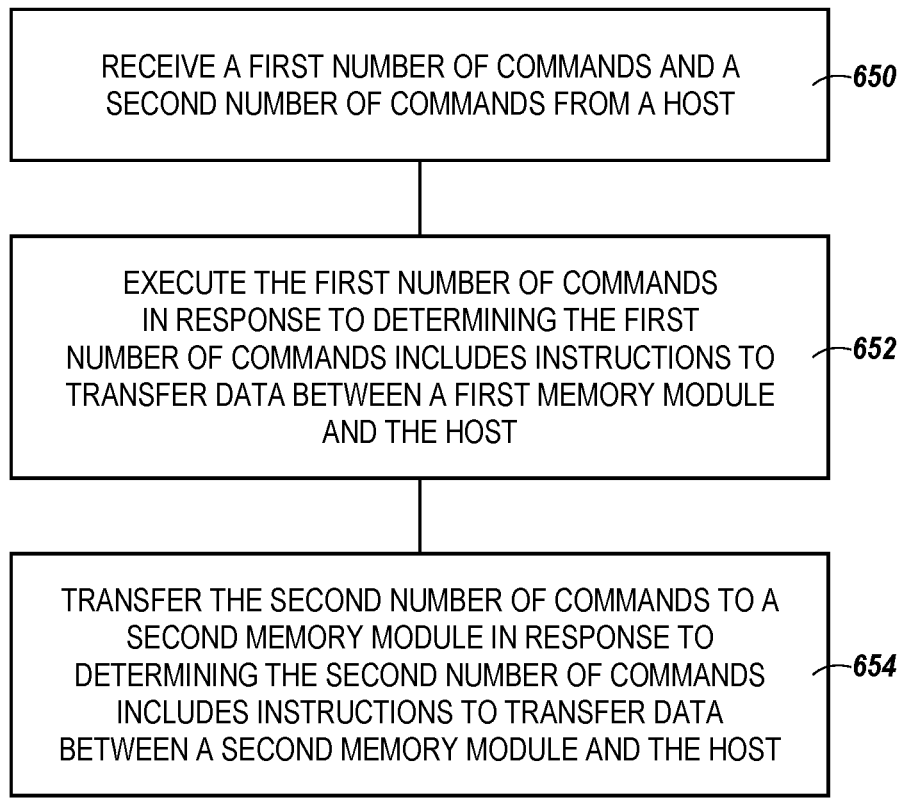
FIG. 6 is a flow diagram illustrating an example method of using a memory module controller in accordance with a number of embodiments of the present disclosure.

FIG. 6 is a flow diagram illustrating an example method of using a memory module controller in accordance with a number of embodiments of the present disclosure. The process described in FIG. 6 can be performed by a memory system including a memory module such as DIMM 310-1 shown in FIG. 3.

As shown in FIG. 6, the method includes, at block 650, receiving a first number of commands and a second number of commands from a host.

The method also includes, at block 652, executing the first number of command in response to determining the first number of commands includes instructions to transfer data between a first memory module and the host.

The method also includes, at block 654, transferring the second number of command to a second memory module in response to determining the second number of commands includes instructions to transfer data between a second memory module and the host.

Although specific embodiments have been illustrated and described herein, those of ordinary skill in the art will appreciate that a different arrangement can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein, will be apparent to those of ordinary skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a first plurality of memory devices;
a second plurality of memory devices configured as cache memory;
a controller coupled to and configured to control access operations to the first plurality and the second plurality of memory devices;
a non-volatile dual in-line memory module (NVDIMM) interface coupled to the controller and couplable to a host and located on a printed circuit board (PCB), the controller configured to communicate with the host via the NVDIMM interface; and;
a second interface located off the PCB, of a different type than the NVDIMM interface, coupled to the controller and couplable to a remote memory module, the controller configured to communicate with the remote memory module via the second interface,
wherein the controller is configured to:
receive a command from the host requesting data from the first plurality of memory devices;
determine whether data associated with the command is located in the second plurality of memory devices;
transfer the data from the second plurality of memory devices to the host in response to determining that the data is located in the second plurality of memory devices;
determine whether data associated with the command is located in the first plurality of memory devices;
transfer the data from the first plurality of memory devices to the host in response to determining that the data is located in the first plurality of memory devices;
transfer the command to the remote memory module in response to determining that the data is not located in the first plurality of memory devices or the second plurality of memory devices; and
receive the data from the remote memory module, transfer the data to the host, and store the data in the second plurality of memory devices.

2. The apparatus of claim 1, wherein the apparatus is a dual in-line memory module, the first plurality of memory devices comprises dynamic random access memory (DRAM) memory devices, and the remote memory module comprises a different type of memory devices.

3. The apparatus of claim 2, wherein the memory devices of the remote memory module comprise at least one of 3D XPoint, NAND flash, or NOR flash, or any combination thereof.

4. The apparatus of claim 1, wherein the controller is configured to cause data from the remote memory module to be transferred to the apparatus via the second interface and data to be transferred from the apparatus to the host via the NVDIMM interface.

5. The apparatus of claim 1, wherein the controller is configured to simultaneously cause a first data transfer between the host and the apparatus via the NVDIMM interface and a second data transfer between the apparatus and the remote memory module via the second interface.

6. The apparatus of claim 1, wherein the NVDIMM interface is configured according to a first protocol and the second interface is configured according to a second protocol different from the first protocol.

7. An apparatus, comprising:
a non-volatile dual in-line memory module (NVDIMM) interface couplable to a host and located on a printed circuit board (PCB);
a second interface, of a different type than the NVDIMM interface, couplable to a memory module and located off the PCB;
a first number of memory devices;
a second number of memory devices configured as cache memory; and
a controller coupled to the NVDIMM interface, the second interface, the first number of memory devices, and the second number of memory devices, wherein the controller is configured to:
execute a number of first commands to transfer data between a host and the first number of memory devices;
transfer a number of second commands and data from the host to the memory module for execution on the memory module;
determine whether data associated with a command requesting the data from the first number of memory devices is located in the second number of memory devices;
transfer the data from the second number of memory devices to the host in response to determining, by the cache controller, that the data is located in the second number of memory devices;
determine whether data associated with the command is located in the first number of memory devices;
transfer the data from the first number of memory devices to the host in response to determining that the data is located in the first number of memory devices;
generate a number of third commands to be executed by the memory module to transfer data between the memory module and the number of memory devices in response to determining that the data is not located in the first number of memory devices or the second number of memory devices; and
receive the data from the remote memory module, transfer the data to the host, and store the data in the second plurality of memory devices.

8. The apparatus of claim 7, wherein the controller is configured to determine the number of first commands are for execution on the apparatus and determine the number of second commands are for execution on the memory module.

9. The apparatus of claim 7, wherein the number of second commands are transferred to a controller on the memory module.

10. The apparatus of claim 7, wherein the number of first commands and the number of second commands are received by the controller from the host.

11. The apparatus of claim 7, wherein the controller is configured to execute the number of second commands by sending data from the host to the memory module on a bus.

12. The apparatus of claim 7, wherein the controller is configured to execute the number of second commands by reading data from the memory module and sending the data read from the memory module to the host on a bus.

13. The apparatus of claim 7, wherein the number of second commands are generated by the host.

14. The apparatus of claim 7, wherein the controller is configured to generate the number of third commands via a direct memory access (DMA) module and execute the number of third commands by transferring data between the number of memory devices of the apparatus and the memory module.

15. The apparatus of claim 7, wherein the controller is configured to receive the number of third commands from a direct memory access (DMA) module and execute the number of third commands by transferring data between the memory module and the number of memory devices of the apparatus.

16. An apparatus, comprising:
a non-volatile dual in-line memory module (NVDIMM) interface couplable to a host and located on a printed circuit board (PCB);
a second interface, of a different type than the NVDIMM interface, couplable to a memory module and located off the PCB;
a first number of memory devices;
a second number of memory devices configured as cache memory; and
a controller coupled to the NVDIMM interface, the second interface, the first number of memory devices, and the second number of memory devices, wherein the controller includes a cache controller and a dynamic random access memory (DRAM) controller and wherein the controller is configured to:
receive a command from the host requesting data from the first number of memory devices;
determine whether data associated with the command is located in the second number of memory devices using the cache controller;
transfer the data from the second number of memory devices to the host in response to determining, by the cache controller, that the data is located in the second number of memory devices;
determine whether data associated with the command is located in the first number of memory devices;
transfer the data from the first number of memory devices to the host in response to determining that the data is located in the first number of memory devices;
transfer the command to the memory module in response to determining, by the cache controller, that the data is not located in the first number of memory devices or the second number of memory devices; and
receive the data from the remote memory module, transfer the data to the host, and store the data in the second plurality of memory devices.

17. The apparatus of claim 16, wherein the controller receives the data from the memory module and transfers the data to the host in response to transferring the command to the memory module.

18. The apparatus of claim 17, wherein the controller is configured to store the data in the first number of memory devices in response to receiving the data from the memory module.

19. The apparatus of claim 16, wherein the second number of memory devices store a cache tag table and cache data; and wherein the cache controller manages the cache tag table and the cache data in the second number of memory devices.

20. The apparatus of claim 16, wherein the command is received by the controller from the host and wherein the command includes instructions to transfer data between the host and the memory module.

21. A method, comprising:
receiving a number of first commands, a number of second commands, and a number of third commands from a host via a non-volatile dual in-line memory module (NVDIMM) interface located on a printed circuit board, the number of first commands, the number of second commands, and the number of third commands each requesting data from a first number of memory devices of a dual in-line memory module;
determining whether data associated with the number of first commands and data associated with the number of second commands are located in a number of second memory devices of the dual in-line memory module configured as cache memory using a cache controller;
executing the number of first commands in response to determining, by the cache controller, that the data associated with the number of first commands is located in the number of second memory devices;
executing the number of second commands in response to determining, by the cache controller, that the data associated with the number of second commands is located in the number of first memory devices;
transferring the number of third commands to a second memory module via an interface of a different type than the NVDIMM interface in response to determining, by the cache controller, that the data associated with the number of third commands is not located in the number of first memory devices or the number of second memory devices, wherein the interface of the different type than the NVDIMM interface is located off the PCB; and
receiving the data from the remote memory module, transferring the data to the host, and storing the data in the second plurality of memory devices.

22. The method of claim 21, wherein executing the number of first commands includes reading data associated with the number of first commands from the number of second memory devices on the dual in-line memory module and sending the data associated with the number of first commands to the host.

23. The method of claim 21, further including receiving, at the dual in-line memory module, data from the second memory module in response to executing the number of third commands.

24. The method of claim 23, further including sending the data received from the second memory module to the host in response to executing the number of third commands.

* * * * *